United States Patent
Jackson, Jr.

[11] Patent Number: 6,131,343
[45] Date of Patent: Oct. 17, 2000

[54] APPARATUS AND METHOD FOR STORM SHELTER

[75] Inventor: Andrew W. Jackson, Jr., Southside, Ala.

[73] Assignee: George L. Williamson, Fairhope, Ala.

[21] Appl. No.: 09/347,726

[22] Filed: Jul. 6, 1999

Related U.S. Application Data

[63] Continuation-in-part of application No. 09/248,942, Feb. 12, 1999.

[51] Int. Cl.[7] .............................. F02D 29/00; E04B 1/32; E04H 9/14
[52] U.S. Cl. .................................. 52/86; 52/88; 52/169.6; 52/745.07; 52/745.08
[58] Field of Search ................................ 52/86, 88, 79.4, 52/79.5, 79.12, 169.6, 745.07, 745.08

[56] References Cited

U.S. PATENT DOCUMENTS

| | | |
|---|---|---|
| 2,328,197 | 8/1943 | Cowin . |
| 3,967,430 | 7/1976 | Knudson ............................. 52/745.07 |
| 4,068,423 | 1/1978 | Marsh . |
| 4,615,158 | 10/1986 | Thornton . |
| 5,333,421 | 8/1994 | McKenna . |
| 5,481,837 | 1/1996 | Minks . |
| 5,611,178 | 3/1997 | Aubert . |
| 5,662,132 | 9/1997 | Larsen . |
| 5,813,174 | 9/1998 | Waller . |

*Primary Examiner*—Robert Canfield
*Attorney, Agent, or Firm*—George L. Williamson

[57] ABSTRACT

The present invention 10 discloses an apparatus and method for a storm shelter which can be used aboveground and belowground, and, may be skin supported. The present invention discloses that its top 11, front 13 and rear 15 surfaces can be made from a single, curved piece of material 12, and, that its sides 14 are made from two straight pieces of material all of which pieces are mounted onto parallel curved fine members 18 which are mounted onto a base frame 16 which is anchored to a foundation 34. The storm shelter of the present invention can be manufactured and pre-assembled in an embodiment having a single piece 12, top 11, front 13 and rear 15 construction or in an embodiment having a multiple piece 46 and 48, top 11, front 13 and rear 15 construction designed for on-site construction in the form of a kit or pieces which can be assembled on-site. The present invention, among other materials, may be constructed of corrugated metal sheeting having a parabolic-like shaped dome 11 for added strenght at its top 11, front 13 and rear 15 surfaces having a base frame member 16 on its lower part within which the corrugated metal sheeting is mounted. Embodiments are described which can be used for aboveground or belowground installation and which may be skin-supported.

70 Claims, 6 Drawing Sheets

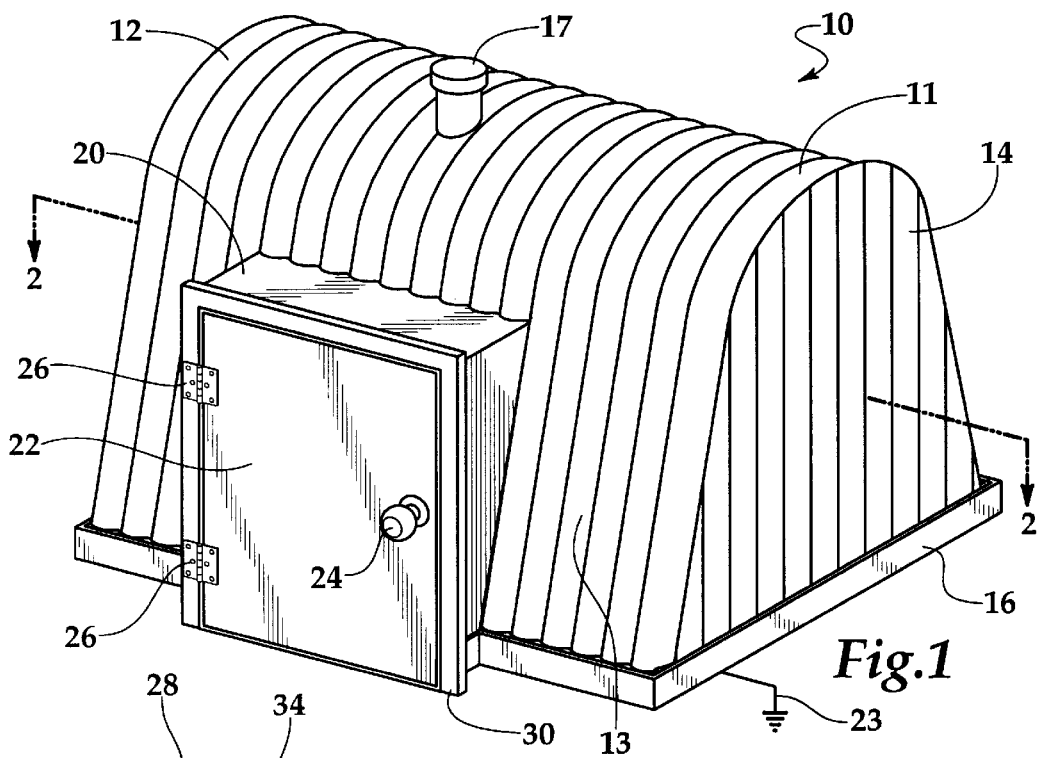
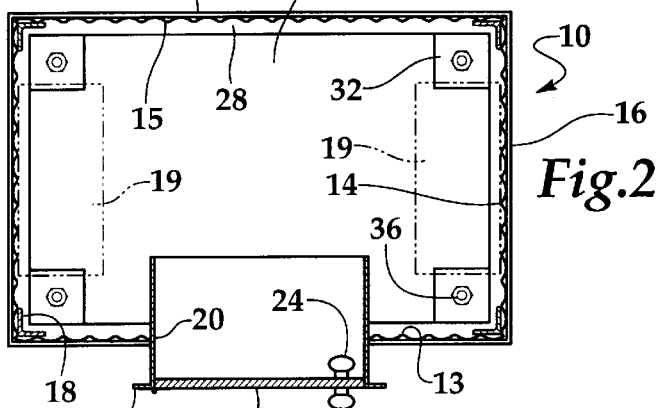
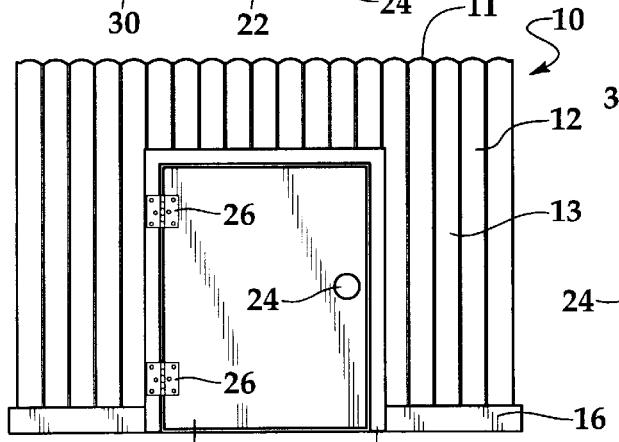
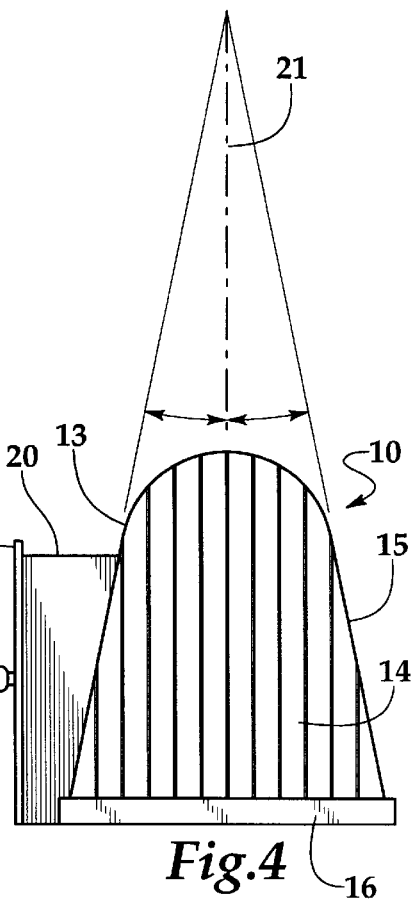

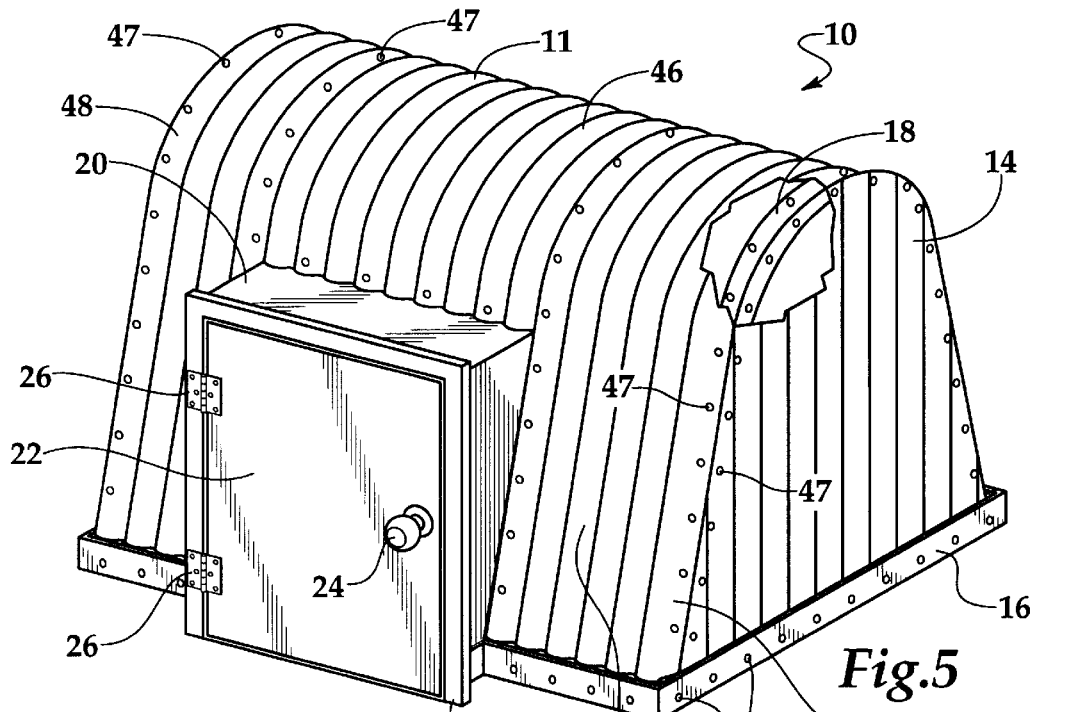
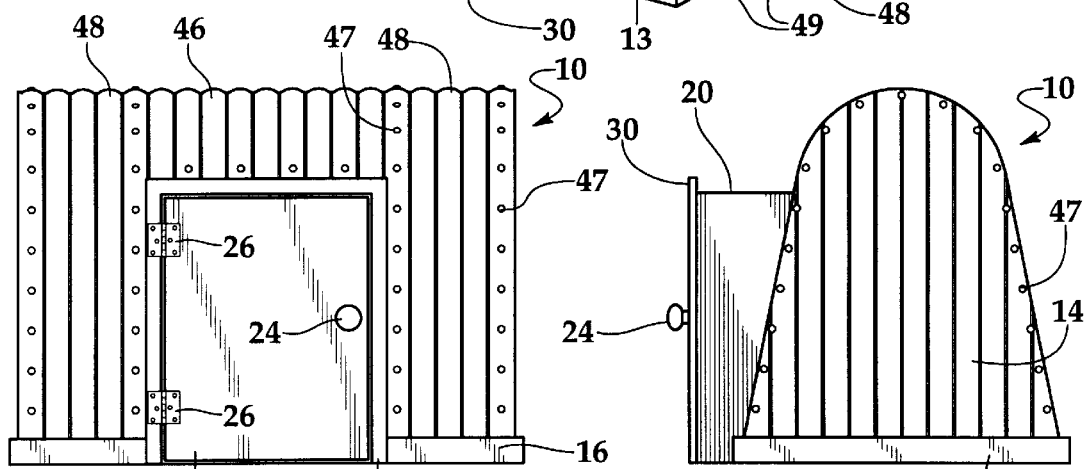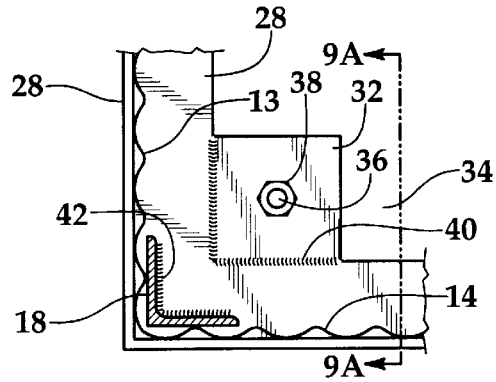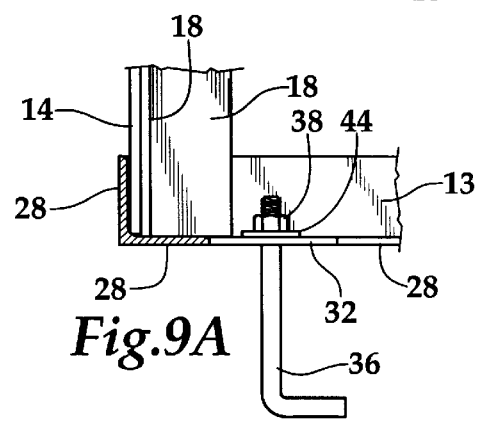

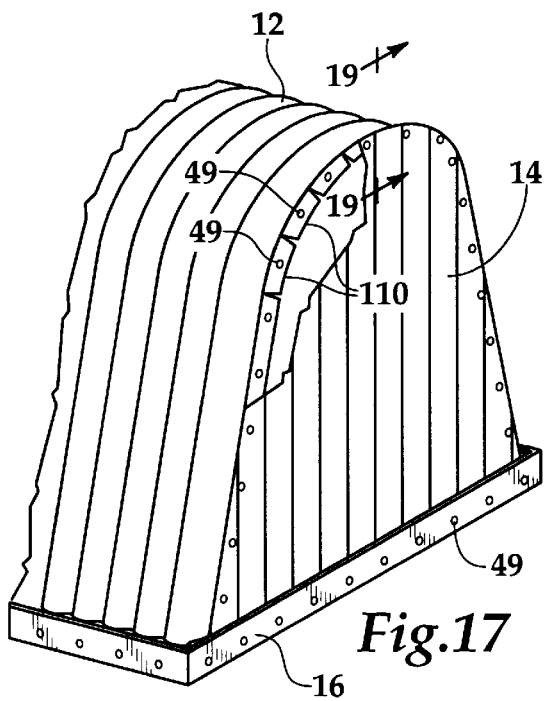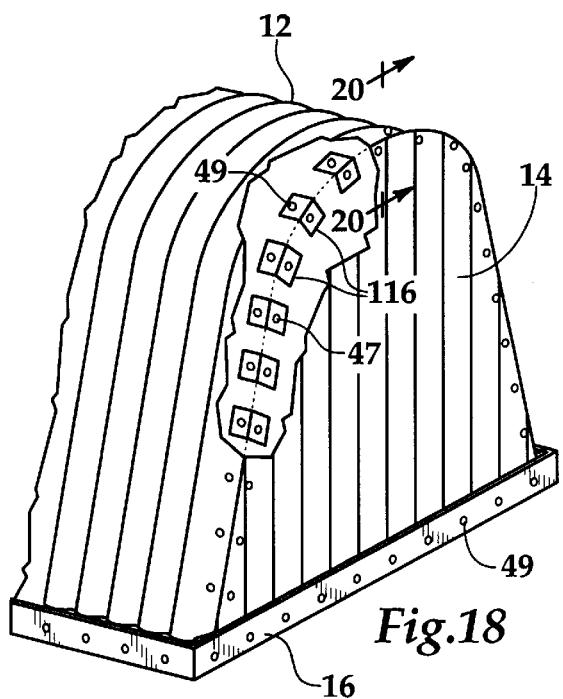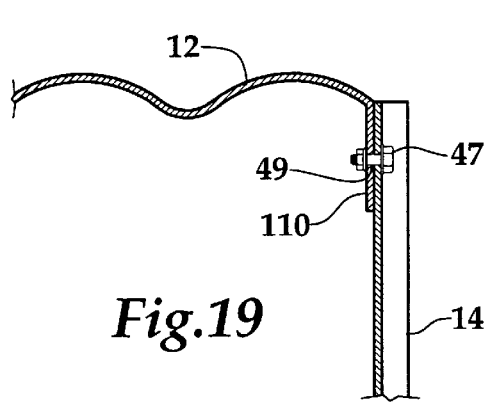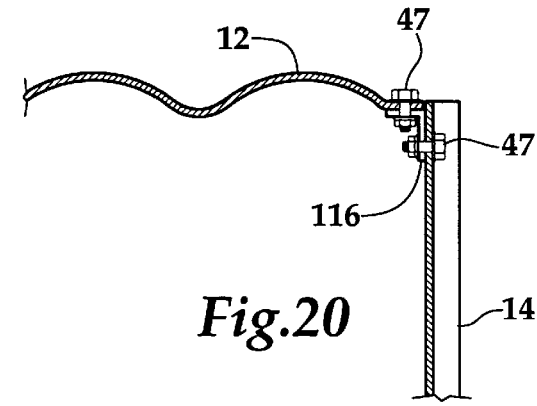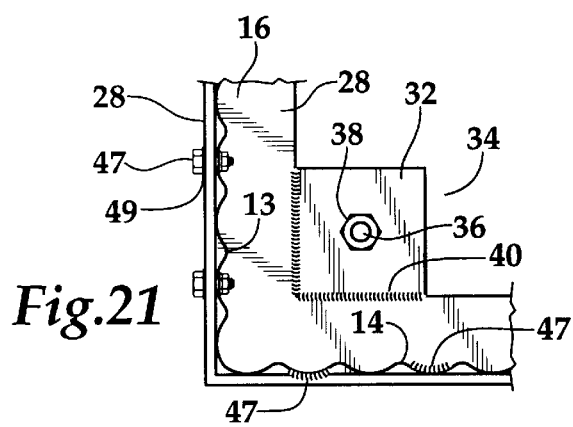

APPARATUS AND METHOD FOR STORM SHELTER

This application is a continuation-in-part application of patent application Ser. No. 09/248,942 filed Feb. 12, 1999.

BACKGROUND OF THE INVENTION

Field of the Invention

The present invention relates generally to the field of storm shelters, more particularly, to a method and apparatus for a storm shelter usable aboveground and belowground, and, which may be skin-supported.

Disclosure Document Program

The present invention was filed with the disclosure document program having a filing date of Nov. 23, 1998, having Disclosure Document No. 447716.

Description of the Prior Art

Storm shelters have been described in the prior art. However, none of the prior art discloses the unique features of the present invention.

In U.S. Pat. No. 5,611,178, dated Mar. 18, 1997, Aubert disclosed an underground shelter for the protection of at least one person, comprising two substantially identical rigid panels which may be assembled together into a tunnel configuration and disassembled by distinct mechanical means arranged so as to permit a joined interfitting of both top parts of both panels, respectively, and a rigid connection between the bottom parts of the latter so that the buried panel may withstand side or transverse forces applied to the panel and resulting from the thrust exerted by the earth layer covering the tunnel.

In U.S. Pat. No. 5,662,132, dated Sep. 2, 1997, Larsen disclosed a structural protective shelter designed to be used around and above beds, office chairs, or anywhere an occupant may be sitting, standing, or reclining. It is ideally suited for protective use against structural building collapse resulting from disasters such as earthquakes, tornadoes, hurricanes, bomb blasts, etc. The shelter is ideally made of steel or like material and is comprised of a rectangular continuously framed base from which rise four, vertical uprights, two pair becoming continuous to radiused corners and common overhead horizontal primary members. Between and perpendicular to said two overhead primary members is attached two horizontal overhead cross members. Between and perpendicular to said two overhead cross members is attached a handle bar grip to be used to help an occupant to maintain position within the shelter during periods of violent movement. X-bracing is attached between one pair of verticals which share a common overhead primary member and between the two sides of the shelter as well as plate bracing is attached over the rectangle shape formed by the two overhead primary members and the two overhead cross members. The four vertical uprights are designed to repel axial force of falling objects down the length of said uprights, while the bracing systems are designed to repel diagonal and lateral forces against the side collapse of said shelter.

In U.S. Pat. No. 4,615,158, dated Oct. 7, 1986, Thornton disclosed a tornado shelter, specially adapted for use with mobile home lots. The shelter is an underground enclosure defined by an annular sidewall and a top and bottom. The top of the enclosure has an entrance and egress passageway in communication with both the enclosure and the bottom of a mobile home. The passageway is surrounded by a flexible sidewall which is movably attached to the top of the underground disclosure and the bottom of the mobile home. An associated collapsible stepladder allows convenient egress. When the mobile home unit is moved, the passageway sidewall may be removed, and the shelter sealed until a new unit is moved in place.

In U.S. Pat. No. 5,481,837, dated Jan. 9, 1996, Minks, Jr. disclosed a shelter to be used with a mobile home in which the mobile home is positioned on a foundation with an entrance spaced a distance above the ground. The storm shelter defines an enclosed volume for receiving at least one individual and includes a top wall juxtaposed to the mobile home beneath the entrance and extends horizontally away form the home, forming a floor of a stoop. A side wall, secured to the top and bottom walls, extends into and is anchored to the ground. The side wall also has at least one door for access into the interior of said volume.

In U.S. Pat. No. 5,813,174, dated Sep. 19, 1998, Waller disclosed a strong light-weight steel structure which consists of individual tubular and bent-plate channel modules which are packaged and shipped loose and which are assembled by the user or a contractor to form a vault or enclosure, preferably rectangular in shape, with a lockable access door. The tubular and channel modules are designed and shaped for assembly within an existing structure and can in fact, be assembled entirely from the inside without access to the outside of the structure so that the system can be installed in an existing enclosure of the same size and shape as the assembled vault. The modules can be screwed or bolted together from the inside so as to form a steel beam structure of substantial strength. The structure can provide protection for occupants against collapse or disintegration of a building structure because of wind storms, tornadoes, seismic events, and the like.

In U.S. Pat. No. 5,333,421, dated Aug. 2, 1994, McKenna disclosed a quonset type house unit designed for use as a greenhouse or residential structure supported by a plurality of arch shaped rib members. It includes a skeleton structure of a pair of L frame members. Applicant believes that McKenna is non-analogous, unrelated art since it does not disclose a structure useable for a storm shelter. However, McKenna was cited as a reference in parent application Ser. No. 09/248,942.

In U.S. Pat. No. 4,068,423, dated Jan. 17, 1978, Marsh disclosed a greenhouse or storage structure comprised of semi-rigid sheet material supported by a plurality of arch shaped rib members. Applicant believes that Marsh is non-analogous, unrelated art since it does not disclose a structure useable for a storm shelter. However, Marsh was cited as a reference in parent application Ser. No. 09/248,942.

In U.S. Pat. No. 2,328,197, dated Aug. 31, 1943, Cowin disclosed an all metal building designed so that it may be readily erected with a minimum of labor which is supported by a plurality of arch shaped rib members. Applicant believes that Cowin is non-analogous, unrelated art since it does not disclose a structure useable for a storm shelter. However, Cowin was cited as a reference in parent application Ser. No. 09/248,942.

While these devices may be suitable for the purposes for which they were designed, they would not be as suitable for the purposes of the present invention, as hereinafter described.

SUMMARY OF THE PRESENT INVENTION

The present invention discloses an apparatus and method for a storm shelter which can be used aboveground and belowground, and, which may be skin-supported. The present invention discloses that its top, front and rear surfaces are made from a single, curved piece of material, and, that its sides are made from two straight pieces of material all of which pieces are mounted onto parallel curved frame members which are mounted onto a base frame which is anchored to a foundation. Furthermore, the present invention may have a skin supported roof system which comprises its top, front, rear, and end surfaces. The storm shelter of the present invention can be manufactured and preassembled in an embodiment having a single piece, top, front and rear construction or in an embodiment having a multiple piece top, front and rear construction designed for on site construction in the form of a kit or pieces which can be assembled on-site. The present invention, among other materials, may be constructed of corrugated metal sheeting having a parabolic-like shaped dome for added strength at its top, front and rear surfaces having a base frame member on its lower part within which the corrugated metal sheeting is mounted. Embodiments are described which can be used for aboveground or belowground installation.

An object of the present invention is to provide a storm shelter which can withstand the wind force from a tornado or hurricane. Another object of the present invention is to provide a storm shelter which is strong enough to repel wind driven debris resulting from a tornado or hurricane.

A further object of the present invention is to provide a storm shelter which can be used aboveground and, with slight modification, belowground. Another object is to provide a storm shelter which can be easily, simply and inexpensively manufactured, therefore, being affordable to most individuals and households. An additional object of the present invention is to provide a storm shelter which can be installed on the interior of a home or similar building in order to create a safe room. A further object of the present invention is to provide a storm shelter which can be adapted to be installed in existing homes or buildings or which can be installed in homes or buildings which are then under construction.

The foregoing and other objects and advantages will appear from the description to follow.

BRIEF DESCRIPTION OF THE DRAWINGS

In order that the invention may be more fully understood, it will now be described, a way of example, with reference to the accompanying drawings in which:

FIG. 1 is a perspective view of one embodiment of the present invention showing a single piece roof construction.

FIG. 2 is a cross-sectional view taken from FIG. 1 as indicated.

FIG. 3 is a front elevational view of one embodiment of the present invention.

FIG. 4 is a side elevational view of one embodiment of the present invention.

FIG. 5 is a perspective view of one embodiment of the present invention showing a multiple piece roof construction.

FIG. 6 is a front elevational view of one embodiment of the present invention.

FIG. 7 is a side elevational view of one embodiment of the present invention.

FIG. 8A is a detailed plan view of one corner of the base frame member showing a typical means for connecting the arcuate frame to the base frame and for anchoring the base frame to a foundation.

FIG. 9A is a cross-sectional view taken from FIG. 8A as indicated.

FIG. 17 is a cut-away view of the present invention showing alternative means for joining pieces of the outer surfaces.

FIG. 18 is a cut-away view of the present invention showing alternative means for joining pieces of the outer surfaces.

FIG. 19 is a cross-sectional view taken from FIG. 17 as indicated of the present invention showing alternative means for joining pieces of the outer surfaces.

FIG. 20 is a cross-sectional view taken from FIG. 18 as indicated of the present invention showing alternative means for joining pieces of the outer surfaces.

FIG. 21 is a detailed plan of one corner of the base frame member showing an alternative means for connecting the sheeting which forms the front, rear and sides to the base frame and for anchoring the base frame to a foundation.

LIST OF REFERENCE NUMERALS

Figure 8B:
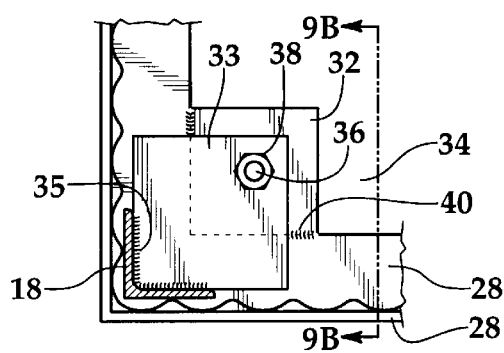
FIG. 8B is a detailed plan view of one corner of the base frame member showing an alternative means for connecting the arcuate frame to the base frame and for anchoring the base frame to a foundation.

With regard to the reference numerals used, the following numbering is used throughtout the drawings:
10 present invention
11 top
12 arcuate sheet
13 front
14 side sheet
15 rear
16 base frame member
17 air vent
18 arcuate frame member
19 seats
20 door frame casing member
21 vertical axis
22 door
23 ground rod
24 door handle
26 door attachment means
28 angle iron
30 door stop
32 anchor plates
33 means for attaching
34 foundation
35 connecting means
36 anchor bolts 38 anchor bolt nut
40 connecting means
42 connecting means
44 washer
46 metal sheet
47 fastening means
48 metal sheet
49 aperture
50 door frame member
52 lintel
53 aperture
54 door jam
56 vertical support member
58 horizontal support member
60 anchor means
62 base support beam
65 seat braces
66 concrete foundation
68 anchor means
70 soil
72 concrete
74 concrete
76 floor
78 steps
80 step frame member
82 top plate
84 horizontal door
86 connecting means
88 handle
90 floor member
92 floor cover
94 floor joist
96 occupant
98 anchor means
100 floor joist
102 floor member
104 nut
106 bolt
108 washer
110 tabs
116 "L" shaped members

DESCRIPTION OF THE PREFERRED EMBODIMENT(S)

Turning now descriptively to the drawings, in which similar reference characters denote similar elements throughout the several views, FIGS. 1 through 21 illustrate the present invention being a storm shelter usable aboveground and belowground which may be skin supported.

Turning to FIG. 1, therein is shown a perspective view of one embodiment of the present invention 10 showing a single piece roof construction. Shown therein is one arcuate member being a single piece of corrugated metal sheeting 12 having a dome formed at its upper apex or top which piece of sheeting 12 forms the top 11, front 13 and rear 15 (not shown but see FIG. 4) sides or surfaces of the present invention 10. Also shown is a side piece 14 of corrugated metal sheeting along with a base frame member 16 and an arcuate frame member 18 (not shown but see FIG. 5) along with an air vent 17. Also shown is a door frame casing member 20 being the entry having a door 22 to which a handle 24 is attached along with a door stop 30. The door 22 has suitable attachment means 26, e.g., a hinge or the like, for attaching the door 22 to the door frame member 20 in the standard manner by one skilled in the art. The base member 16 has appropriate grounding and/or corrosion control means 23 being a ground strap, rod or other means as used in standard practice by one skilled in the art. Note that the present invention may be constructed of corrugated sheeting having straight, parallel, regular and equally curved ridges and hollows, valleys, or grooves therein. It is also believed that it may be possible that the sheeting could be made of metal, fiberglass, plastic, ceramic, pressed wood or the like. It is believed that corrugated sheeting will be the preferred construction material in order to provide extra strength needed for safety of the present invention since it is designed for high wind conditions. However, it is believed that it may also be possible to use flat or non-corrugated sheets to make the present invention if the flat sheets are thick enough to provide the required strength and safety. Therefore, it should be understood that references to or drawings showing corrugated sheets in this specification could also refer to flat or non-corrugated sheets if that were the material chosen by the builder to be used for construction. Note that the arcuate sheet 12 and end sheets 14 tightly engage each other, the base frame 16, and the door frame 20 to make the present invention substantially airtight.

Turning to FIG. 2, therein is shown a cross-sectional view taken from FIG. 1 as indicated. Shown therein is the angle iron 28 which is used to form the rectangularly shaped base frame member 16. Also shown is the door frame casing member 20 along with the door 22, handle 24 and the door stop 30. In use, access into the interior of the storm shelter of the present invention is obtained by a user opening the door 22 using handle 24 and entering into the inside of the present invention 10 and thereafter closing the door 22 which has an interior door handle so that the occupant can exit the enclosure. Also shown are multiple anchor plates 32 which are attached to the concrete, wooden or steel floor or foundation 34 using multiple anchor bolts 36 or other suitable means whereby the storm shelter is anchored to the floor 34 by using the anchor plate 32 and anchor bolts 36 in the standard manner by one skilled in the art. Also shown is the corrugated metal sheeting 13, 14 and 15 which form the top, front, rear and side surfaces of the present invention 10 along with multiple seats 19 on which the occupants can sit. The arcuate frame members 18 are also shown. In this embodiment there is no additional floor member since the foundation 34 serves as the floor for the storm shelter. Since the present invention 10 is anchored directly to the foundation 34 there is no air space therebetween and therefore it is not possible for wind from a tornado or hurricane to get underneath the present invention 10 in order to weaken or overthrow it, thereby making it safer.

Turning to FIG. 3, therein is shown a front elevation view of the present invention 10 showing the arcuate corrugated metal sheeting 12, front surface 13, top surface 11, the base member frame 16, along with the door 22, the door stop 30, handle 24 and hinges 26.

Turning to FIG. 4, therein is shown a side elevational view of one embodiment of the present invention 10. Shown is the side piece of corrugated metal sheeting 14 cut, shaped and sized to fit on the side of the arcuate frame member 18 (not shown but see FIG. 5), the base frame member 16, the door frame member 20 along with the handle 24 and stop 30. Note that the arcuate frame member 18 (not shown but see FIG. 5) is constructed in the approximate shape of a parabola so that the front and rear walls or surfaces 13, 15 form an angle with the vertical axis 21 of approximately 11 degrees being in the range of 5 to 17 degrees; though angles greater than or less than this are believed to be acceptable. This shape is obtained by forming the arcuate frame member 18 and sheet 12 so that the dome is constructed on an approximate two foot radius. A dome radius of about 2 feet at its apex results in a storm shelter having a height ranging from about 4.0 feet to about 7.5 feet, more particularly about 4.5 feet in height which will allow the present invention to fit within a home or building with an 8 foot ceiling. Models of the present invention built with the dome arc radius of about 2 feet and a base frame member being about 4 feet wide and about 6 feet long would be about 4.5 feet high and are intended to house about 2–3 occupants. Models can be built with a dome arc radius of about 2 feet having a height greater than 4.5 feet and base frame width greater than 4 feet and still maintain the approximate 6 foot length in order to house more than about 2–3 occupants by making the front 13 and rear 15 surfaces longer. Of course, the present invention could be built to have a different size of dome radius which could cause the height and size of the present invention to vary.

Note that the arcuate sheets with their dome formed at the top of the present invention 10 gives it exceptional strength and allows it to be free-standing and self-supporting requiring no additional internal or external roof or side supports or bracing other than the arcuate frame members 18. Since the present invention is free-standing, it does not need any additional side support in order to provide its exceptional vertical and lateral strength characteristics which allows it to be used aboveground or inside a home without requiring any additional lateral support, as for example, would be required by certain types of underground storm shelters requiring backfill around their perimeter for additional support. Also note that it is believed that the domed sheeting 12 should be formed in such a matter that when it is placed inside the base frame member 16 that the two bottom edges of the front 13 and rear 15 sheets which contact with the base frame 16 are preferably tensioned or biased away from each other in order to provide additional strength. However, it is also believed that this tensioning apart is not required in order for the present invention 10 to have exceptional strength.

The sheeting which forms the external surfaces of the present invention 10 is generally rigid. This rigidity would generally prevent excessive flexural bending and is characteristic of all of the external sheeting used with all embodiments of the present invention and comprises arcuate sheet 12, top 1, front 13, rear 15, the pair of sides 14, and sheet 46 and 48. This rigidity allows the external sheeting to form an exoskeleton-like external frame which is exceptionally strong, being self-supporting and free-standing and, may thereby form a skin-supported structure. The arcuate frame members 18 furnish only a means of interconnecting the external sheets 11, 12, 13, 14, 15, 46 and 48, and, therefore, are not necessary for and do not support the external sheeting 12 and 14 as shown in FIGS. 17 through 20.

It is theoretically possible to construct the external sheeting 11, 12, 13, 14, 15, 46 and 48 of the present invention (including door 22 and external members 82 and 84 of the underground embodiment) of such lightweight material that the external sheeting would not be skin-supporting, and, this type of construction is common in non-analogous or unrelated prior art such as greenhouses. Obviously, this type of lightweight structure would not be useable as an aboveground storm shelter because it would not be structurally sound in high wind conditions, and, furthermore, is not the preferred type of construction for a belowground storm shelter for the same reason. A skin-supported structure is the preferred embodiment of the present invention for aboveground and belowground storm shelters It should be understood that the issue of whether the external sheeting 11, 12, 13, 14, 15, 46 and 48 is skin-supported or not, depends on the strength characteristics of sheets 11, 12, 13, 14, 15, 46 and 48 which depends on such factors as the type of material used, e.g., metal, corrugated metal, or fiberglass, and the design, e.g., flat or corrugated, and the thickness of the material. The manner in which sheets 11, 12, 13, 14, 15, 46 and 48 are joined together is also a factor to be considered. It is to be understood that use of the term "skin-supported" in this patent application refers to the fact that all of the external sheets comprising sheets 11, 12, 13, 14, 15, 46 and 48 are effectively strong enough and are interconnected in such a manner as would be understood to be skin supported by those skilled in the art.

It is believed that corrugated metal sheeting having a thickness ranging from $\frac{1}{16}$ inch to $\frac{3}{16}$ inch, more particularly $\frac{3}{16}$ inch, will be the preferred material for constructing the skin-supported external sheeting or exoskeleton of the present invention. It is believed that $\frac{3}{16}$ inch thick corrugated metal sheeting of the preferred embodiment of the present invention will have an effective thickness and strength capable of preventing the penetration of, or perforation by, i.e., it will deflect, a 2 inch by 4 inch piece of timber having a weight of approximately 15 pounds travelling at approximately 100 miles per hour with the longitudinal axis of the 2 inch×4 inch timber disposed in a direction generally perpendicular to the external sheeting or exoskeleton of the present invention (hereinafter this test may be referred to as "the 2 inch by 4 inch test"). It is also believed that corrugated metal sheeting of less than $\frac{3}{16}$ inch thickness will have an effective thickness and strength capable of passing the 2 inch by 4 inch test. However, the applicant does not know the minimum thickness of corrugated metal sheeting that has an effective thickness and strength capable of passing the 2 inch by 4 inch test.

Turning to FIG. 5, therein is shown a perspective view of a second embodiment of the present invention 10 showing a multiple piece roof construction of the present invention 10. Shown therein are multiple pieces being three pieces of corrugated metal sheeting including a middle or central piece 46 and two similar adjacent lateral pieces 48 contiguous with middle piece 46 having a dome formed at their upper apex which multiple pieces of sheeting 46 and 48 form the top 11, front 13 and rear 15 (not shown) sides or surfaces of the present invention 10, otherwise being similar to the embodiment with a single piece top, front and rear construction shown in FIG. 1. Sheets 46 and 48 run parallel to each other so that the outer two sheets 48 each form about one-third of the top 11, front 13, and rear 15 (not shown) surfaces of the present invention, and, the middle sheet 46 in association with the door frame member forms the remaining one-third of the top, front and rear surfaces. Also shown is side piece 14 of corrugated metal sheeting along with a base frame member 16 and arcuate frame member 18. Other features discussed in FIG. 1 are also shown. Note that the individual pieces of corrugated metal sheeting are attached to the arcuate frame member 18, base frame member 16, door frame 20, and tightly mated to each other using appropriate multiple fastening means 47, e.g., spot welds, nuts and bolts, rivets, self tapping or self-threading screws or like means as done in standard practice by one skilled in the art, so that the shelter is effectively airtight and effectively strong enough for its intended use. It should be obvious that fastening means 47 would pass through apertures 49. The purpose of using multiple pieces to form the top 11, front 13 and rear 15 (not shown) surfaces is to make it feasible to ship and construct the present invention on the interior of a pre-existing home or building by allowing the pieces to be smaller in size in order to allow the pieces to be moved through a smaller interior door which would likely exist in a pre-existing home or building. The smaller, multiple pieces may also be easier and cheaper to ship by common carrier.

In order that all of the embodiments of the present invention be effectively airtight, means for sealing the openings in and between the sheets, corrugations and frame members which form all the surfaces of the present invention should be provided which means could include rubber seals or gaskets, caulking or the like as done in the standard manner by one skilled in the art.

Turning to FIG. 6, therein is shown an elevation view of the present invention 10 showing the pieces of corrugated metal sheeting 46 and 48, the base member frame 16, along with the door stop 30, the door 22, handle 24, and multiple fastening means 47.

Turning to FIG. 7, therein is shown a side elevational view of one embodiment of the present invention 10. Shown is the side corrugated metal sheeting 14, the base frame member 16, the door frame member 20, handle 24 and multiple fastening means 47.

Turning to FIG. 8A, therein is shown a plan view of a means for anchoring 32 the present invention to a foundation 34. Shown therein is the angle iron 28 which is used to form the base frame member along with the anchor bolts 36 having a threaded male portion upon which anchor bolt nut 38 is positioned thereby providing means of securing the anchor plate 32 to the floor 34. Also shown are means 40 for connecting the anchor plate 32 to the angle iron 28. Note that the anchor plate 32 is connected by means 40 on multiple edges to the angle iron 28 for added strength. Connecting means 40 could be pre-cast, welding, or like means as done in standard practice by one skilled in the art. Also shown therein are the corrugations of the metal sheeting which could be sheets 13, 14 or 15. Also shown therein is the angle iron of the arcuate frame member 18 having connecting means 42 to the angle iron of the base frame member 28. Connecting means 42 could be welding or like means as done in standard practice by one skilled in the art.

Turning to FIG. 8B, therein is shown a plan view similar to FIG. 8A of an alternative means for attaching 33 the arcuate frame member 18 to the base frame angle iron 28 and to the foundation 34. Shown is a rectangular plate 33 being connected to the end of frame member 18 at 35 by welding or like means as done in standard practice by one skilled in the art. Also shown is plate 33 being anchored to foundation 34 through plate 32 using anchor bolt 36 and anchor bolt nut 38.

Turning to FIG. 9A, therein is shown an elevation cross-sectional view taken from FIG. 8A as indicated. Shown therein is the angle iron 28 of the base frame along with the anchor plate 32, anchor bolts 36, anchor bolt nut 38, and washer 44 connected as previously described. Also shown is the arcuate frame member 18 and sheets 13 and 14.

Figure 9B:
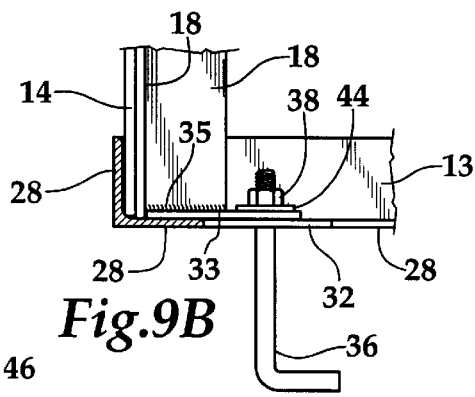
FIG. 9B is a cross-sectional view taken from FIG. 8B as indicated.

Turning to FIG. 9B, therein is shown an elevation cross-sectional view similar to FIG. 9A taken from FIG. 8B as indicated. Shown therein is angle iron 28, anchor plate 32, plate means 33 for attaching frame member 18 to angle iron 28 and anchor plate 32.

Figure 10:
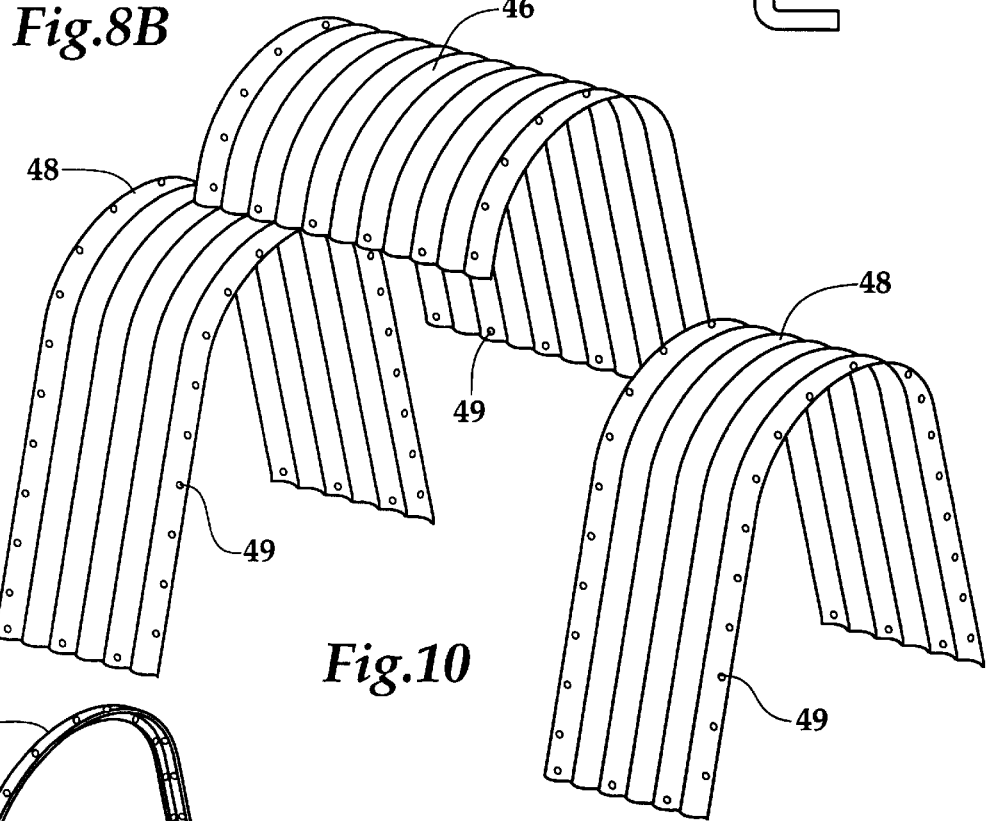
FIG. 10 is an exploded view of parts of one embodiment of the present invention as shown in FIG. 5.

Turning to FIG. 10, therein is shown an exploded view of the multiple pieces 46, 48 of corrugated metal sheeting which are used to form the dome or roof section of the present invention. Note that the middle piece 46 attaches between and connects the two outside members 48 so that the three pieces are thereby securely attached to each other through apertures 49 using appropriate fastening means 47 (not shown) as previously described as done in standard practice by one skilled in the art. The three pieces 46, 48 together form the top, front, and rear surfaces of the present invention.

Figure 11:
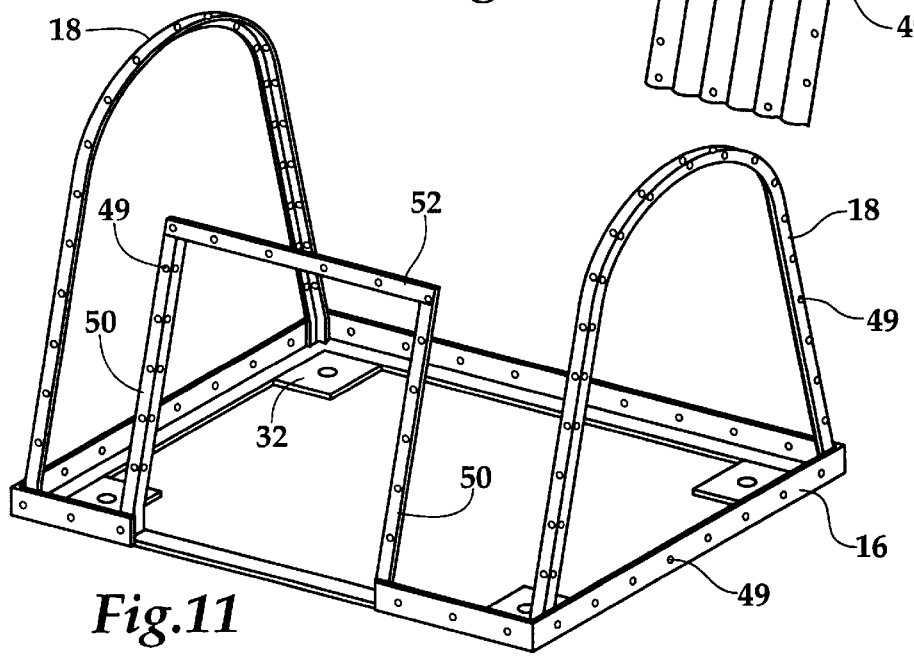
FIG. 11 is a perspective view of the frame members of the present invention.

Turning to FIG. 11, therein is shown the arcuate frame member 18 being angle iron attached to the angle iron base frame member 16. Also shown is the door frame member 50 having a lintel 52 at its upper ends. Angle iron is the preferred material for all of the frame members 16, 18, 50 and 52 because it allows for attachment or connecting means between two perpendicular planes and provides exceptional strength of joiner between the two perpendicular planes. Apertures 49 are shown through which fastening means 47 (not shown) could pass. Note that the front edge of the piece of angle iron within the door frame 50 is removed to allow for insertion of the door frame member 20 (see FIG. 12).

Figure 12:
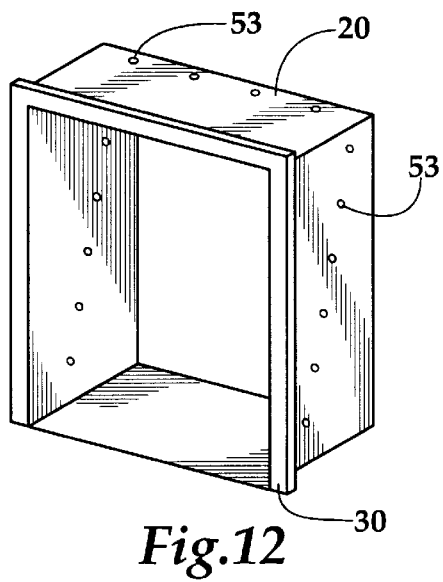
FIG. 12 is a perspective view of the door frame of the present invention.

Turning to FIG. 12, therein is shown a perspective view of the rectangular door frame casing member 20 having multiple apertures or holes 53 therein for receiving fastening means 47 (not shown) used to attach door frame members 50 and 52 to door frame member 20.

Figure 13:
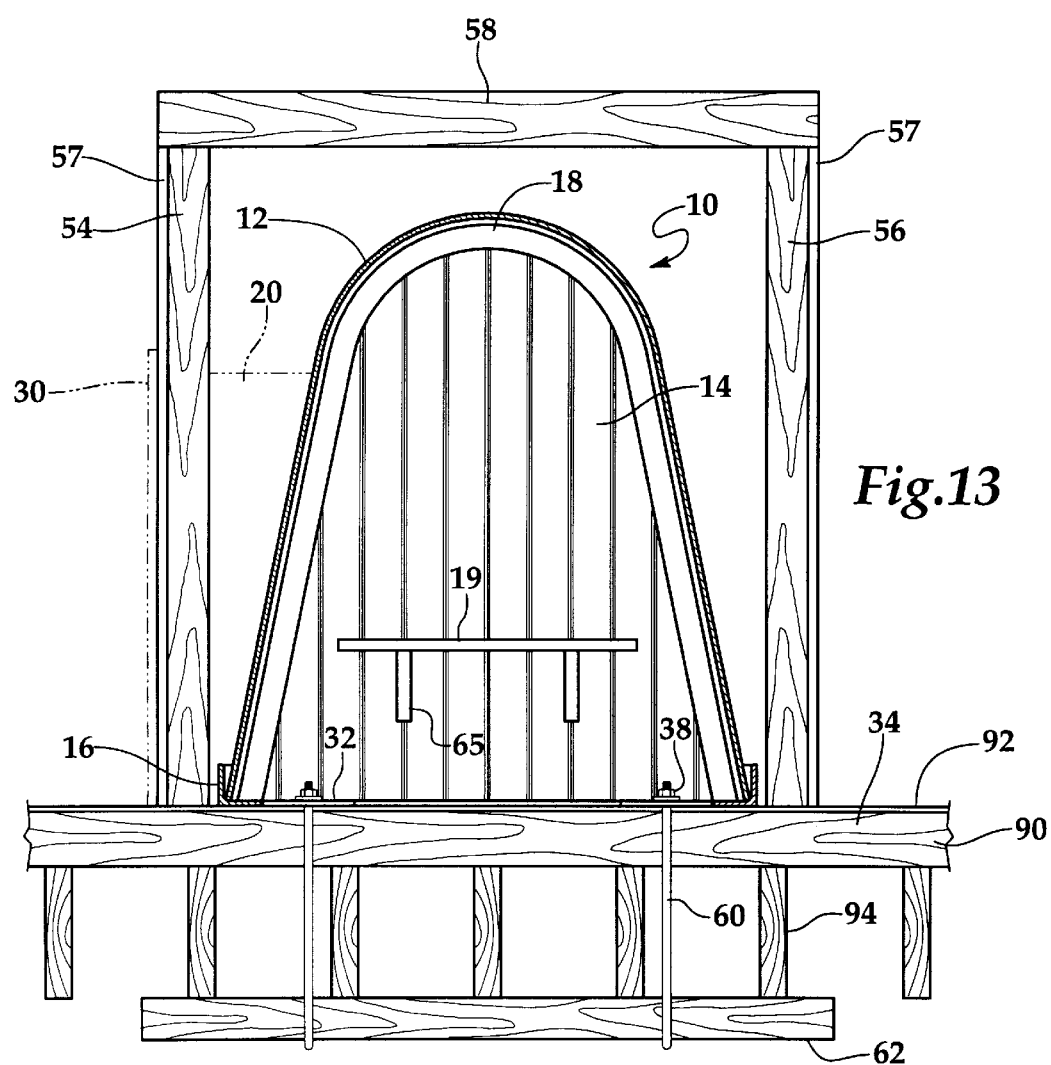
FIG. 13 is a cross-sectional view of the present invention including a wooden support structure.

Turning to FIG. 13, therein is shown a cross-sectional view of the present invention 10. Shown therein is the curved frame member 18, the roof metal sheeting 12, the end or side piece 14 of the metal sheeting along with the door frame 20, and door stop 30. Note that the door stop 30 is offset to the front, otherwise positioned or spaced apart from the base frame 16 so as to allow the placement of a door jam 54 or other wall stud member or other similarly sized structural member as used in standard practice by those skilled in the art in order to install the present invention 10 into a stud wall on the inside of a home or similar building. Also shown is a rear wooden support member 56 along with a top horizontal support member 58 which could form the top piece of the structure, e.g., a piece of furniture, work surface, ledge or like, which would enclose or cover the present invention inside a home or similar building. Note also that the present invention 10 is anchored through its anchor plates 32 using anchor bolt attachment means 60 to a base brace or support beam being member 62. Also shown is a seat member 19 with seat braces 65 placed on the inside of the present invention 10 upon which a user could sit. Also shown is a front and rear stud wall covering 57 which could be sheetrock or other like or decorative material used in standard practice by those skilled in the art which purpose would be to make an enclosure or safe room housing the present invention to be aesthetically appealing. Note that the foundation 34 upon which the present invention is mounted comprises wood beam 90, floor cover member 92, with floor joists 94. In order to securely mount the present invention 10 to a wooden floor bracing beam 62, e.g., a 4 inch by 4 inch beam or the like of suitable length is placed under several joists 94 and then the base frame 16 is attached to beam 62 using means 60 which could be a threaded U-bolts, J-bolts, metal straps or the like which means are attached to the anchor plates 32 using a nut 38 all of which would be accomplished in the standard manner by one skilled in the art. It is believed that this arrangement would securely mount the present invention 10 to the wood foundation 34 as might be necessary in a home or building with a wooden foundation.

Figure 14:
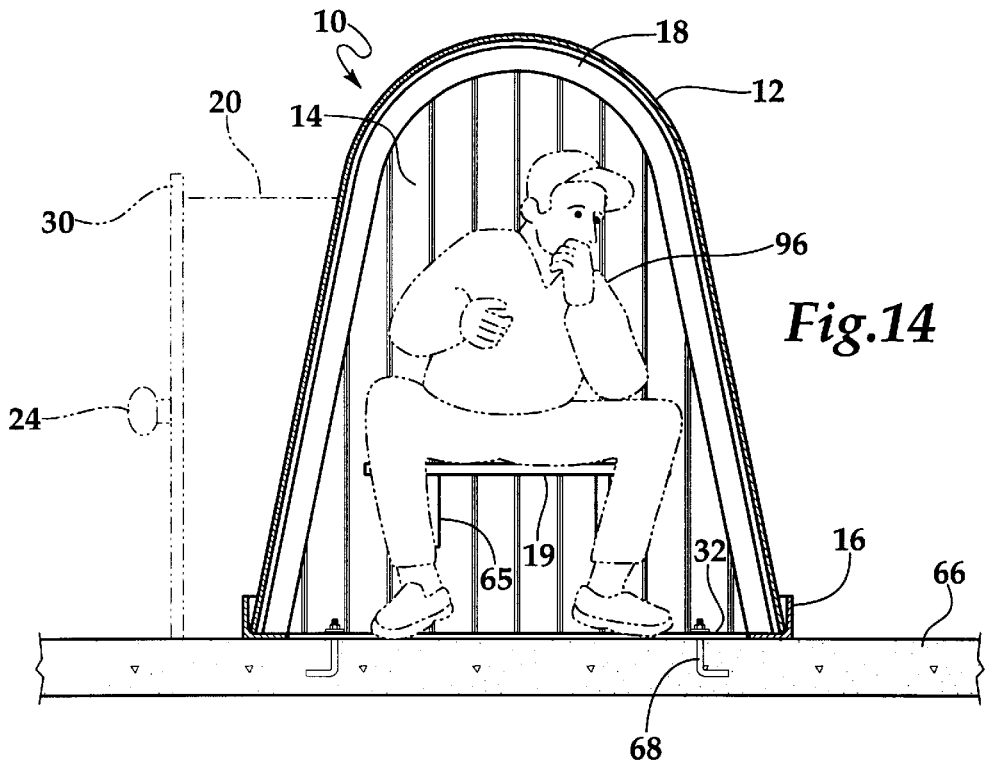
FIG. 14 is a cross-sectional view taken from inside the present invention toward the side wall.

Turning to FIG. 14, therein is shown a cross-sectional view of the present invention 10 taken from the inside toward the side wall. Shown therein is the occupant 96, frame member 18, the roof metal sheeting 12, the end or side piece 14 of the metal sheeting along with the door frame 20, and door stop 30 with handle 24. Note that FIG. 2 shows that there is also an inside door handle. Note that this embodiment is anchored to a concrete foundation 66 using appropriate anchoring means 68 which attaches through the anchor plates 32 to the concrete foundation 66 in a standard manner as done by those skilled in the art. Also shown is seat 19 and brace 65. Note that no separate floor is necessary for this embodiment since the foundation 66 serves as the floor.

Figure 15:
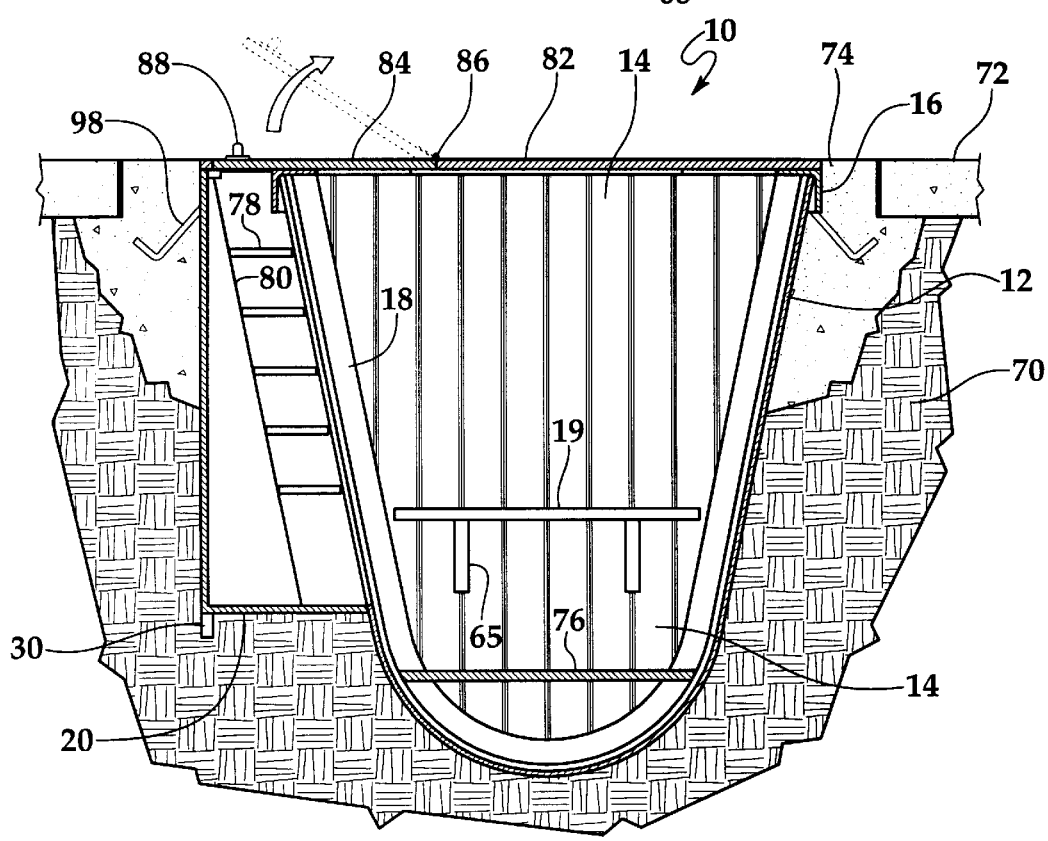
FIG. 15 is a cross-sectional view taken from a line which approximately bisects the door frame casing toward the side wall of a belowground embodiment.

Turning to FIG. 15, therein is shown the present invention 10 in an embodiment which can be used for belowground installation. Note that essentially the difference between the aboveground embodiment and the belowground embodiment is that the aboveground embodiment previously described is simply turned upside down or inverted and fitted with steps 78, floor 76, step frame member 80, top plate 82 and door 84. Also shown therein is the earth or soil 70 into which the present invention 10 can be installed. Also shown therein is a preexisting concrete pad 72 which may or may not be present at the installation site. If concrete 72 were present it could represent the foundation of the interior of a home, the garage or other room of a residential structure or similar building. Also shown is newly poured concrete 74 which would be used to backfill around the area immediately surrounding the present invention so as to form a joiner between the present invention 10 and the earth 70 and/or preexisting concrete 72. Shown therein is the frame member 18, the roof metal sheeting 12, the end or side piece 14 of the metal sheeting along with the door frame 20, and door stop 30. Also shown is a member 76 which is used as a floor along with a repositioned seat member 19 and braces 65. Also shown is a set of steps 78 mounted in the area formed by the door frame member 20 and situated in the door frame member 20 whereby the user can easily and conveniently move into and out of the present invention 10. Also shown is a top plate forming a seal 82, which could be equipped with an air vent (not shown), having a door member 84 horizontally positioned with connecting means 86 for connecting to plate 82 along with a door handle 88 used to open the door 84 from the exterior of the present invention 10. Note that the top plate 82 and door 84 are mounted flush with, or level with concrete 72 and 74. Appropriate anchor means 98 are shown which would be attached to the base member 16 or other appropriate member so as to anchor the present invention 10 into concrete 74 or soil 70 if concrete 74 was not present. Note that the present invention 10 could be mounted directly into the soil 70 without any concrete being present if the installer chose to do so.

Figure 16:
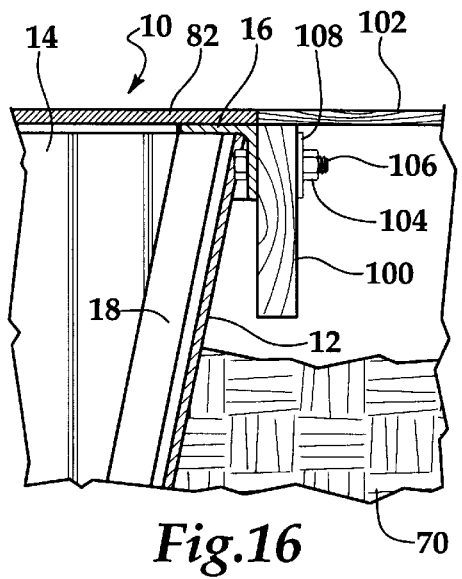
FIG. 16 is a cross-sectional view taken through the base frame member showing alternative anchoring means.

Turning to FIG. 16, therein is shown a detailed cross-sectional view taken through base frame member 16 which shows alternative anchoring means for anchoring the belowground embodiment of the present invention 10 to a wooden foundation member 100. This is a view of a belowground embodiment installed in soil 70, showing base frame 16, arcuate frame 18, side wall 14, top plate 82 and sheet 12. Also shown is a wooden or like floor member 102 which could be the flooring in a home or building along with a floor support member 100 which could be a floor joist or like member. Shown is the base frame 16 being anchored to the floor joist 100 using a nut 104 and bolt 106 with washer 108. It is anticipated that the embodiment of the present invention 10 shown in FIG. 15 would be installed substantially similarly as shown in FIG. 15 through the wooden foundation of a house or building but have anchoring means similar to that shown in FIG. 16 for anchoring the present invention 10 to the wooden foundation 100 and 102 as would be done by those skilled in the art in the standard manner. In this manner, the present invention 10 could be installed beneath a wooden frame home or building and entered by the occupant without the occupant leaving the home or building, similar to a home or building basement, cellar or the like.

With reference to FIGS. 17 through 20, therein are shown alternative means for interconnecting the sheet member 12, i.e., sheets 11, 13, 14, 15, 46 and 48 to the pair of sides 14, which eliminates the need for arcuate frame member 18 and still retains the structural strength of the present invention. FIG. 17 shows a plurality of tabs 110 having apertures 49 therein for receiving fasteners, tabs 110 being cut out of the lateral edge of top member 12 with the tabs 110 turned downwardly to be generally perpendicular to sheet 12. FIG. 19 which is a cross-section view of FIG. 17 shows member 12 and 14, tabs 110 having an exemplary fastener means 47, e.g., a nut and bolt, passing through apertures 49 which apertures extend through both sheets 12 and 14. Note that tabs 110 are shown in FIG. 17 only on sheet 12, but the tabs 110 could just as easily be placed on sheet 14 and mounted on the inside or outside surface of sheet 12 as would be done in the standard manner by one skilled in the art. FIG. 18, shows a plurality of short pieces 116 comprised of "L" shaped angle iron having a pair of apertures 49 therein for receiving fastener means 47. Apertures 49 extend through both sheets 12 and 14 and "L" shaped member 116 is installed on the inside of sheets 12 and 14.

Turning to FIG. 21, shown therein is a detailed plan view of one corner of the base frame member 16 showing an alternative means for attaching, using fastening means 47 which may pass through apertures 49, the external sheeting which forms the front 13, rear 15 and sides 14 to the base frame angle iron 28 and for anchoring the base frame 16 to a foundation 34. Note that there is no arcuate frame member 18 used with this embodiment as previously described in FIGS. 17 through 20. Alternative fastening means nuts and bolts are shown on one edge of the corner and welding is shown on the other edge of the corner, however, this is merely exemplary and nuts and bolts or welding could be used on either edge. The welds could be spot welds or continuous welds and could be on the inside, outside or both sides of the sheeting 13, 14 or 15. Fastening means 47 could be, e.g., spot welds, nuts and bolts, rivets, self tapping or self-threading screws or like means as done in standard practice by one skilled in the art.

The general method of construction of the present invention comprises the steps of (1) providing multiple metal sheets, (2) cutting the metal sheets to the proper size, (3) bending or curving a metal sheet or multiple sheets 46, 48 to make the arcuate top member 12 of the storm shelter, (4) providing a base frame 16, (5) forming a pair of arcuate frame members 18, (6) attaching the metal sheets to the arcuate frame member 18, (7) attaching the arcuate frame member 18 to the base frame member 16, (8) placing a door frame casing 20 with door 22 inside the metal frame 50, (9) attaching all the pieces to each other as previously described, and, (10) sealing as needed. Alternatively, arcuate frame member 18 can be eliminated and the metal sheets attached directly to the base frame 16.

The method of construction or assembly of the aboveground embodiment of the present invention comprises the steps of: (1) place the rectangular base frame 16 in place and anchor to the foundation 34 in the standard manner; (2) install curved end frame members 18; (3) install the door frame members 50, 52; (4) install the two end curved roof sheets 48; (5) install the center curved roof sheet 46; (6) fasten roof sheets 46, 48 to angle iron framing 18, 50, 52; (7) slide in door frame 20 and fasten to angle iron frame 50, 52; (8) install door hinges 26; (9) install door 22; (10) install door handle 24; (11) install seats 19; and, (12) seal as necessary. Alternatively, arcuate frame member 18 can be eliminated and the metal sheets attached directly to the base frame 16.

The method of construction or assembly of the belowground embodiment of the present invention comprises the steps of (1) prepare belowground floor opening and excavation; (2) install the rectangular base frame 16; (3) drop curved roof panels 46, 48 into the opening with the center panel first; (4) install end sheets 14 to curved angle frame 18 and place into floor opening; (5) mount and fasten steps 78 and stair well frame 80 onto door frame casing 20; (7) pull each end roof sheet 14 and curved angle frame 18 up to the base member 16 and fasten in place; (8) pull center roof sheet 46 up to match roof sheet 48 or end roof sheets 14 and fasten in place; (9) install door frame casing 20 and fasten to frame 50, 52; (10) install floor 76 and seats 19; (11) install top 82 and door 84; and, (12) seal as necessary. Alternatively, arcuate frame member 18 can be eliminated and the metal sheets attached directly to the base frame 16.

It is anticipated that the single piece roof construction embodiment will be pre-assembled at the point of manufacture and then shipped to the user in one piece for installation and mounting on a foundation. It is anticipated that the multiple piece roof construction embodiment will be shipped as a disassembled unit and assembled and installed on-site by the user.

In the foregoing description reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the invention. The foregoing detailed description is, therefore, not to be taken in a limiting sense, and the scope of the present invention is best defined by the appended claims.

What is claimed is:

1. An apparatus for a storm shelter, comprising:

a) a base frame member being generally rectangular shaped;

b) means for anchoring said base frame member to a foundation;

c) an enclosure defined by a top surface, a front surface, a rear surface, and a first and a second side surfaces;

d) a pair of arcuate frame members upon which to fasten said surfaces of the storm shelter, said arcuate frame members consisting of two arcuate frame members;

e) a first member of said pair of arcuate frame members attached to a first side of said base frame member;

f) a second member of said pair of arcuate frame members attached to a second side of said base frame member;

g) means for attaching said pair of arcuate frame members to said base frame member;

h) a rigid arcuate sheet forming said top surface, said front surface, and said rear surface of the storm shelter;

i) a pair of rigid sheets, one of which forms said first side surface, and one of which forms said second side surface of the storm shelter;

j) means for fastening said rigid arcuate sheet and said pair of rigid sheets to said pair of arcuate frame members whereby the top surface, the front surface, the rear surface and the side surfaces of the storm shelter are formed;

k) a skin-supported enclosure formed by said top surface, said front surface, said rear surface, said first side surface, and said second side surface;

l) an entry provided in at least one of said surfaces of the storm shelter; and, m) an aboveground storm shelter formed by said skin-supported enclosure.

2. The apparatus of claim 1, wherein said rigid arcuate sheet further comprises multiple rigid arcuate sheets forming said top surface, said front surface, and said rear surface of the storm shelter.

3. The apparatus of claim 1, wherein said rigid arcuate sheet further comprises three rigid arcuate sheets forming said top surface, said front surface, and said rear surface of the storm shelter.

4. The apparatus of claim 1, wherein said base frame member further comprises angle iron.

5. The apparatus of claim 1, wherein said base frame member is rectangular in shape.

6. The apparatus of claim 1, said base frame member further comprises a plurality of anchor plates, said anchor plates having means for connection to said base frame member.

7. The apparatus of claim 6, said anchor plates having an aperture therein, said aperture for receiving said means for anchoring to a foundation.

8. The apparatus of claim 1, said arcuate frame members further comprising angle iron.

9. The apparatus of claim 6, said means for connection further comprises welding.

10. The apparatus of claim 1, wherein said rigid arcuate sheet and said pair of rigid sheets further comprises metal.

11. The apparatus of claim 1, wherein said rigid arcuate sheet and said pair of rigid sheets further comprises corrugated metal.

12. The apparatus of claim 1, said means for attaching and said means for fastening further comprises welding.

13. The apparatus of claim 1, said means for attaching and said means for fastening further comprises nuts and bolts.

14. The apparatus of claim 1, said means for fastening further comprises screws.

15. The apparatus of claim 1, further comprising said skin-supported enclosure having a thickness effective to deflect a 2 inch by 4 inch piece of timber having a weight of about 15 pounds travelling at about 75 miles per hour with the longitudinal axis of said 2 inch by 4 inch timber disposed substantially perpendicular to said skin-supported enclosure.

16. The apparatus of claim 1, further comprising said skin-supported enclosure having a thickness effective to deflect a 2 inch by 4 inch piece of timber having a weight of about 15 pounds travelling at about 100 miles per hour with the longitudinal axis of said 2 inch by 4 inch timber disposed substantially perpendicular to said skin-supported enclosure.

17. An apparatus for a storm shelter, comprising:

a) a base frame member;

b) means for anchoring said base frame member to a foundation;

c) an enclosure defined by a top surface, a front surface, a rear surface, and a first and a second side surfaces;

d) a rigid arcuate sheet forming said top surface, said front surface, and said rear surface of the storm shelter;

e) a pair of rigid sheets, one of which forms said first side surface, and one of which forms said second side surface of the storm shelter;

f) means for interconnecting said rigid arcuate sheet to said pair of rigid sheets, said means for interconnecting directly connecting said rigid arcuate sheet to said pair of rigid sheets;

g) means for fastening said rigid arcuate sheet and said pair of rigid sheets to said base frame member whereby the top surface, the front surface, the rear surface and the side surfaces of the storm shelter are formed;

h) a skin-supported enclosure formed by said top surface, said front surface, said rear surface, said first side surface, and said second side surface;

i) an entry provided in at least one of said surfaces of the storm shelter; and, j) an aboveground storm shelter formed by said skin-supported enclosure.

18. The apparatus of claim 17, wherein said rigid arcuate sheet further comprises multiple rigid arcuate sheets forming said top surface, said front surface, and said rear surface of the storm shelter.

19. The apparatus of claim 17, wherein said rigid arcuate sheet further comprises three rigid arcuate sheets forming said top surface, said front surface, and said rear surface of the storm shelter.

20. The apparatus of claim 17, wherein said base frame member further comprises angle iron.

21. The apparatus of claim 17, wherein said base frame member is rectangular in shape.

22. The apparatus of claim 17, said base frame member further comprises a plurality of anchor plates, said anchor plates having means for connection to said base frame member.

23. The apparatus of claim 22, said anchor plates having an aperture therein, said aperture for receiving said means for anchoring to a foundation.

24. The apparatus of claim 17, said arcuate frame members further comprising angle iron.

25. The apparatus of claim 22, said means for connection further comprises welding.

26. The apparatus of claim 17, wherein said rigid arcuate sheet and said pair of rigid sheets further comprises metal.

27. The apparatus of claim 17, wherein said rigid arcuate sheet and said pair of rigid sheets further comprises corrugated metal.

28. The apparatus of claim 17, said means for interconnecting and said means for fastening further comprises welding.

29. The apparatus of claim 17, said means for interconnecting and said means for fastening further comprises nuts and bolts.

30. The apparatus of claim 17, said means for fastening further comprises screws.

31. The apparatus of claim 17, further comprising said skin-supported enclosure having a thickness effective to deflect a 2 inch by 4 inch piece of timber having a weight of about 15 pounds travelling at about 75 miles per hour with the longitudinal axis of said 2 inch by 4 inch timber disposed substantially perpendicular to said skin-supported enclosure.

32. The apparatus of claim 17, further comprising said skin-supported enclosure having a thickness effective to deflect a 2 inch by 4 inch piece of timber having a weight of about 15 pounds travelling at about 100 miles per hour with the longitudinal axis of said 2 inch by 4 inch timber disposed substantially perpendicular to said skin-supported enclosure.

33. The apparatus of claim 17, said means for interconnecting further comprises welding said rigid arcuate sheet to said pair of rigid sheets.

34. The apparatus of claim 17, said means for interconnecting further comprising said rigid arcuate sheet having a plurality of tabs disposed thereon having apertures therein, said means for interconnecting further comprising fastener means, said apertures for receiving said fastener means, said tabs disposed on the lateral edges of said rigid arcuate sheet, said tabs oriented substantially perpendicular to said rigid arcuate sheet for connection to said pair of rigid sheets using said fastener means.

35. The apparatus of claim 17, said means for interconnecting further comprising said pair of rigid sheets having a plurality of tabs disposed thereon having apertures therein, said means for interconnecting further comprising fastener means, said apertures for receiving said fastener means, said tabs disposed on the lateral edges of said pair of rigid sheets, said tabs oriented substantially perpendicular to said pair of rigid sheets for connection to said rigid arcuate sheet using said fastener means.

36. The apparatus of claim 17, said mean for interconnecting further comprising said rigid arcuate sheet and said pair of rigid sheets having a plurality of apertures therein, said means for interconnecting further comprising fastener means, said plurality of apertures for receiving said fastener means, said plurality of apertures disposed adjacent the lateral edges of said rigid arcuate sheets and said pair of rigid sheets for connection of said rigid arcuate sheet to said pair of rigid sheets using said fastener means.

37. The apparatus of claim 17, said mean for interconnecting further comprising said rigid arcuate sheet and said pair of rigid sheets having a first plurality of apertures therein, said means for interconnecting further comprising a plurality of "L" shaped members, said plurality of "L" shaped members having a second pair of apertures therein, said means for interconnecting further comprising fastener means, said first plurality of apertures and said second pair of apertures for receiving said fastener means, said first plurality of apertures disposed adjacent the lateral edges of said rigid arcuate sheets and said pair of rigid sheets for connection of said rigid arcuate sheet to said pair of rigid sheets using said "L" shaped members and said fastener means.

38. An apparatus of claim 1, wherein said front surface and said rear surface each form an angle in the range of 5 to 17 degrees with respect to the vertical axis of said front surface and said rear surface.

39. The apparatus of claim 17, wherein said front surface and said rear surface each form an angle in the range of 5 to 17 degrees with respect to the vertical axis of said front surface and said rear surface.

40. The apparatus of claim 38, wherein said rigid arcuate sheet further comprises three rigid arcuate sheets forming said bottom surface, said front surface, and said rear surface of the storm shelter.

41. The apparatus of claim 38, wherein said base frame member further comprises angle iron.

42. The apparatus of claim 38, wherein said base frame member is rectangular in shape.

43. The apparatus of claim 38, said arcuate frame members further comprising angle iron.

44. The apparatus of claim 38, wherein said entry is formed in said top surface, said entry further comprising steps, said entry further comprising a door.

45. The apparatus of claim 38, further comprising a floor member.

46. The apparatus of claim 38, further comprising multiple seats for the occupants.

47. The apparatus of claim 38, wherein said rigid arcuate sheet and said three rigid sheets further comprises metal.

48. The apparatus of claim 38, wherein said rigid arcuate sheet and said three rigid sheets further comprises corrugated metal.

49. The apparatus of claim 38, said means for attaching and said means for fastening further comprises welding.

50. The apparatus of claim 38, said means for attaching and said means for fastening further comprises nuts and bolts.

51. The apparatus of claim 38, said means for fastening further comprises screws.

52. An apparatus for a storm shelter, comprising:
   a) a base frame member;
   b) means for anchoring said base frame member to a foundation;
   c) an enclosure defined by a top surface, a bottom surface, a front surface, a rear surface, and a first and a second side surfaces;
   d) a rigid arcuate sheet forming said bottom surface, said front surface, and said rear surface of the storm shelter;
   e) three rigid sheets, one of which forms said top surface, one of which forms said first side surface, and one of which forms said second side surface of the storm shelter;
   f) means for interconnecting said rigid arcuate sheet and said three rigid sheets;
   g) means for fastening said rigid arcuate sheet and said three rigid sheets to said base frame member whereby the top surface, the bottom surface, the front surface, the rear surface, and the side surfaces of the storm shelter are formed; and,
   h) an entry provided in at least one of said surfaces of the storm shelter, whereby a storm shelter usable belowground is formed.

53. The apparatus of claim 52, wherein said rigid arcuate sheet further comprises multiple rigid arcuate sheets forming said bottom surface, said front surface, and said rear surface of the storm shelter.

54. The apparatus of claim 52, wherein said rigid arcuate sheet further comprises three rigid arcuate sheets forming said bottom surface, said front surface, and said rear of the storm shelter.

55. The apparatus of claim 52, wherein said base frame member further comprises angle iron.

56. The apparatus of claim 52, wherein said base frame member is rectangular in shape.

57. The apparatus of claim 52, wherein said entry is formed in said top surface, said entry further comprising steps, said entry further comprising a door.

58. The apparatus of claim 52, further comprising a floor member.

59. The apparatus of claim 52, further comprising multiple seats for the occupants.

60. The apparatus of claim 52, wherein said rigid arcuate sheet and said three rigid sheets further comprises metal.

61. The apparatus of claim 52, wherein said rigid arcuate sheet and said three rigid sheets further comprises corrugated metal.

62. The apparatus of claim 52, said means for interconnecting and said means for fastening further comprises welding.

63. The apparatus of claim 52, said means for interconnecting and said means for fastening further comprises nuts and bolts.

64. The apparatus of claim 52, said means for fastening further comprises screws.

65. A method of making a storm shelter, comprising the steps of:
   a) providing a plurality of rigid sheets from which various surfaces of the storm shelter would be made;
   b) cutting said sheets to the proper size;
   c) curving a single rigid sheet into a rigid arcuate sheet to form top, front and rear surfaces of the shelter;
   d) forming a base frame member being generally rectangular shaped upon which to mount a pair of arcuate frame members of the storm shelter, said arcuate frame members consisting of two arcuate frame members, further attaching a first member of said pair of arcuate frame members to a first side of said base frame member, and attaching a second member of said pair of arcuate frame members to a second side of said base frame member;
   e) attaching said rigid arcuate sheet and a pair of rigid side sheets to said pair of arcuate frame members;
   f) attaching a door frame casing to said base frame member;
   g) mounting a door in said door frame casing; and,
   h) forming a skin-supported enclosure by fastening said members to each other, whereby an aboveground storm shelter is formed.

66. The method of claim 65, further comprising the steps of inverting said storm shelter, said inverted storm shelter having said rigid arcuate sheet form said bottom surface, said front surface, and said rear surface of said storm shelter, attaching a rigid sheet to said base frame member to form a top, whereby a belowground storm shelter is formed.

67. The apparatus of claim 1, wherein said entry is formed in said rigid arcuate sheet, said entry further comprising a door.

68. The apparatus of claim 1, further comprising multiple seats for occupants.

69. The apparatus of claim 17, wherein said entry is formed in said rigid arcuate sheet, said entry further comprising a door.

70. The apparatus of claim 17, further comprising multiple seats for occupants.

* * * * *